United States Patent [19]

Funk et al.

[11] Patent Number: 5,973,014
[45] Date of Patent: Oct. 26, 1999

[54] PROCESS FOR THE PREPARATION OF POROUS, HYDROPHILIC, HIGHLY SWELLABLE HYDROGELS

[76] Inventors: Rüdiger Funk; Norbert Herfert; Ulrich Riegel, all of Hoechst Aktiengesellschaft, D-65926 Frankfurt am Main, Germany

[21] Appl. No.: 08/829,493

[22] Filed: Mar. 27, 1997

[30] Foreign Application Priority Data

Mar. 29, 1996 [DE] Germany .............................. 196 12 628

[51] Int. Cl.$^6$ ....................................................... C08J 9/28
[52] U.S. Cl. ............................ 521/64; 521/142; 521/149; 521/182; 521/183
[58] Field of Search .............................. 521/64, 149, 182, 521/183, 142

[56] References Cited

U.S. PATENT DOCUMENTS

| | | |
|---|---|---|
| 4,624,868 | 11/1986 | Muller . |
| 4,898,908 | 2/1990 | Lahalih . |
| 5,081,163 | 1/1992 | Pekala ........................................ 521/64 |
| 5,629,353 | 5/1997 | Steckle, Jr. et al. ....................... 521/64 |
| 5,674,642 | 10/1997 | Le et al. . |
| 5,705,535 | 1/1998 | Jansen et al. ............................... 521/64 |

FOREIGN PATENT DOCUMENTS 62-135504  6/1987  Japan .

OTHER PUBLICATIONS

European Search Report dated Apr. 14, 1998.
Derwent Abstract No. XP002060864 Dec. 1985.

*Primary Examiner*—John M. Cooney, Jr.
*Attorney, Agent, or Firm*—David T. Banchik

[57] ABSTRACT

The present application relates to a process for the preparation of porous, hydrophilic, highly swellable hydrogels, which comprises freeze-drying hydrophilic, highly swellable hydrogels which have been swollen with water.

15 Claims, No Drawings

PROCESS FOR THE PREPARATION OF POROUS, HYDROPHILIC, HIGHLY SWELLABLE HYDROGELS

Process for the preparation of porous, hydrophilic, highly swellable hydrogels The present invention relates to a process for the preparation of porous, hydrophilic, highly swellable hydrogels by the freeze-drying of swollen, hydrophilic, highly swellable hydrogels.

Hydrophilic, highly swellable hydrogels are in particular polymers of (co)polymerized hydrophilic monomers, graft (co)polymers of one or more hydrophilic monomers on a suitable graft base, crosslinked cellulose ethers or starch ethers, crosslinked carboxymethylcellulose, partially crosslinked polyalkylene oxide or natural products which are swellable in aqueous media, such as guar derivatives. Such hydrogels are used as products which absorb aqueous solutions in the production of diapers, tampons, sanitary towels and other hygiene articles, and also as water-retentive agents in agricultural horticulture.

Such liquid-absorbing hydrogels are required to have, in addition to a high liquid absorption capacity, a high speed of swelling. However, if the speed of swelling is too high, the undesired effect of "gel blocking" appears, mainly on the surface of the resin particles; in this, the excessively swollen resin particles at the surface form a barrier for the remainder of the liquid to be absorbed, and in this way further absorption of liquid is only slow or even impossible. The speed of swelling can, however, be increased by increasing the specific surface area of the absorptive resin, without giving rise to the undesired effect of "gel blocking" described above. Absorptive resins having a porous structure therefore show advantages in comparison with absorptive resins having a non-porous structure.

Consequently, there has been no lack of attempts to provide porous, hydrophilic, highly swellable hydrogels.

DE-A-38 31 261 describes the preparation of a porous, liquid-absorbing, crosslinked acrylic polymer by the polymerization of a partially neutralized aqueous solution of acrylic or methacrylic acid and a monomer which causes crosslinking. Here, the porous structure of the acrylic polymer is obtained by addition of an N-containing blowing agent, which decomposes or sublimes with the formation of a gas during drying of the acrylic polymer at from 80 to 250°πC.

U.S. Pat. No. 5,354,290 describes porous, polymeric structures comprising water-swellable, water-insoluble polymeric material, prepared by polymerizing suitable water-soluble monomers together with a water-soluble crosslinking agent in an oil-in-water emulsion. During the drying of the polymer thus obtained, the volatile oil phase evaporates and gives rise to pores in the polymeric material.

WO 94/22502 describes a superabsorbent polymer foam, prepared by polymerizing suitable monomers in the presence of a blowing agent, preferably having a vaporization temperature below 50° C.

DE-A 36 37 057 describes a process for the preparation of a porous polymer having water-absorbing properties. The monomers suitable for the preparation of these porous polymers are polymerized in the aqueous phase of an O/W/O emulsion. During the drying of the polymers thus obtained, a porous structure of the polymers is created by the evaporation of the oil phase of the oil-in-water emulsion.

A joint feature of these processes is that the porous structure of the water-absorbing polymer resins is achieved by the addition of a blowing agent which vaporizes during the drying of the resin. These processes have the disadvantage, however, that the vaporization of the blowing agent takes place in a random manner, so that pore size and pore distribution in the water-absorbing polymer resins is difficult to regulate and to control.

EP-A-0 105 634 describes a sulfonated, porous, crosslinked polymeric material which is able to absorb water and aqueous salt solutions. This porous, crosslinked, polymeric material is prepared by polymerizing water-insoluble monomers, for example styrene, alkyl (meth)acrylates and divinylbenzene, in a high internal phase emulsion having water as the internal phase, followed by sulfonation of the porous polymer obtained.

WO 93/04092, WO 93/04093, WO 93/04115 and WO 94/13704 describe absorbent foam materials prepared by polymerization of water-soluble, "glassy" monomers, such as styrene and styrene derivatives, together with water-insoluble "rubbery" monomers, such as 2-ethylhexyl acrylate, and together with water-insoluble crosslinking agents, such as divinylbenzene, in a high internal phase emulsion having water or aqueous $CaCl_2$ solution as the internal phase. The ratio of internal to disperse phase here is from 20:1 to 70:1. The foam material so obtained after drying is hydrophilized by washing with surfactant solutions.

A joint feature of these processes is that the porous structure of the water-absorbing polymer resins is obtained by polymerization of water-insoluble monomers in a high internal phase emulsion having water as the internal phase, followed by drying. These processes, however, have a number of disadvantages. Because of the high ratio which is required between the internal and the disperse phase, the space yield in the polymerization step is very small. The preparation of a high internal phase emulsion requires the use of comparatively large amounts of surfactant, which remain in the porous, water-absorbing polymer and can be re-extracted from the product during its use in hygiene articles such as sanitary towels or diapers. This is problematic because of the general irritative effect of surfactants on mucous membranes. Because the porous water-absorbing polymer resin from the processes described must be built up from hydrophobic, water-insoluble monomer units, an additional step has to follow after the polymerization in order to render the polymer resin hydrophilic. This is disadvantageous on cost grounds.

Finally, EP-A421 264 describes hydrophilic, swellable polymers which have a highly porous, foam-like polyhedral structure. These hydrophilic, swellable polymers are prepared by polymerization of suitable hydrophilic monomers in an aqueous medium containing a surfactant together with the monomers, and stabilized by a liquid hydrocarbon phase. The polymerization medium particularly preferably contains from 60 to 99% by weight of hydrocarbons.

This process is, however, disadvantageous on cost grounds because the high hydrocarbon content of the polymerization medium permits only a small space yield in the polymerization and requires removal of large amounts of hydrocarbon from the polymer.

There therefore continues to be a need for a process for the preparation of porous, hydrophilic, highly swellable polymers which does not have the disadvantages described above, is simple to carry out, and permits the pore size and pore distribution in the polymer to be established as desired.

It has now been found, surprisingly, that this object is achieved by the freeze-drying of swollen, non-porous, hydrophilic polymers prepared by known methods. The present invention accordingly relates to a process for the preparation of porous, hydrophilic, highly swellable hydrogels, which comprises freeze-drying hydrophilic, highly swellable hydrogels which have been swollen with water.

Freeze-drying is the term for the drying of a deep-frozen material under high vacuum by freezing out the solvent and then evaporating it in the frozen state (sublimation drying). During the drying, the frozen material retains its original shape, so that after drying a material having a very porous structure is obtained.

The novel process can be carried out in any freeze-drying apparatus. These are obtainable commercially or, at least, are well-known to a person skilled in the art. The freeze-drying can be carried out batchwise or continuously.

The hydrogels to be freeze-dried are employed in their swollen form. This means that they have a certain water content. By means of this water content, it is possible to regulate the pore size and pore distribution of the hydrogels to be prepared according to the invention. The water:hydrogel weight ratio is preferably from 2:1 to 500:1, particularly preferably from 4:1 to 200:1 and very particularly preferably from 5:1 to 100:1.

The hydrogels prepared by the novel process have a BET specific surface area of preferably from 2 to 15 m²/g, particularly preferably from 3 to 10 m²/g. The specific pore volume of these hydrogels is preferably from $1.3 \times 10^{-2}$ to $2 \times 10^{-1}$ cm³/g, particularly preferably from $5 \times 10^{-2}$ to $1.5 \times 10^{-1}$ cm³/g. The quotient of pore volume and mean pore radius (dV/dR) is termed pore radius distribution—generally a Gaussian distribution curve—expressed as cm³/g×Å (Å stands for Ångström). The preferred pore radius distribution of the hydrogels prepared according to the invention is preferably from 1.5 to 5 cm³/g×Å, particularly preferably from 1.8 to 3 cm³/g×Å.

Suitable hydrophilic, highly swellable hydrogels which can be freeze-dried according to the invention are in particular polymers of (co)polymerized hydrophilic monomers, graft (co)polymers of one or more hydrophilic monomers on a suitable graft base, crosslinked cellulose ethers or crosslinked starch ethers or natural products which are swellable in aqueous media, such as guar derivatives. These hydrogels are known to the person skilled in the art. Hydrophilic monomers suitable for preparing these hydrophilic, highly swellable hydrogels are, for example, polymerizable acids, such as acrylic acid, methacrylic acid, vinylsulfonic acid, vinylphosphonic acid, maleic acid and its anhydride, fumaric acid, itaconic acid, 2-acrylamido-2-methylpropanesulfonic acid, 2-acrylamido-2-methylpropane-phosphonic acid, and their amides, hydroxyalkyl esters and esters and amides containing amino groups or ammonium groups. Water-soluble N-vinylamides and also diallyldimethylammonium chloride are also suitable.

Preferred hydrophilic monomers are compounds of the formula I

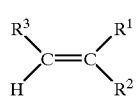

(I)

where
  $R^1$ is hydrogen, methyl or ethyl,
  $R^2$ is the —COOR⁴ group, the sulfonyl group, the phosphonyl group, the phosphonyl group esterified with a ($C_1$–$C_4$)-alkanol, or a group of the formula

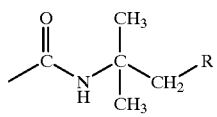

$R^3$ is hydrogen, methyl, ethyl or the carboxyl group,
$R^4$ is hydrogen, amino or hydroxy-$C_1$–$C_4$-alkyl and
$R^5$ is the sulfonyl group, the phosphonyl group or the carboxyl group.

Examples of $C_1$–$C_4$-alkanols are methanol, ethanol, n-propanol and n-butanol.

Particularly preferred hydrophilic monomers are acrylic acid and methacrylic acid.

Hydrophilic hydrogels which can be obtained by polymerizing olefinically unsaturated compounds are already known and are described, for example, in U.S. Pat. No. 4,057,521, U.S. Pat. No. 4,062,817, U.S. Pat. No. 4,525,527, U.S. Pat. No. 4,286,082, U.S. Pat. No. 4,340,706 and U.S. Pat. No. 4,295,987

Hydrophilic hydrogels obtainable by graft copolymerization of olefinically unsaturated acids onto various matrices, for example polysaccharides, polyalkylene oxides and their derivatives, are already known and are described, for example, in U.S. Pat. No. 5,011,892, U.S. Pat. No. 4,076,663 or U.S. Pat. No. 4,931,497. Suitable graft bases may be of natural or of synthetic origin. Examples are starch, cellulose or cellulose derivatives, and other polysaccharides and oligosaccharides, polyalkylene oxides, in particular polyethylene oxide and polypropylene oxide, and hydrophilic polyesters.

Suitable polyalkylene oxides have, for example, the formula

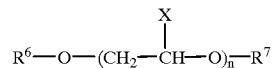

where
  $R^6$ and $R^7$ are, independently of one another, hydrogen, alkyl, alkenyl or acrylyl,
  X is hydrogen or methyl and
  n is an integer from 1 to 10 000.
  $R^6$ and $R^7$ are preferably hydrogen, ($C_1$–$C_4$)-alkyl, ($C_2$–$C_6$)-alkenyl or phenyl.

Preferred hydrogels are in particular polyacrylates, polymethacrylates and the graft polymers described in U.S. Pat. No. 4,931,497, U.S. Pat. No. 5,011,892 and U.S. Pat. No. 5,041,496. The content of these patent specifications is also expressly incorporated into this disclosure.

The hydrophilic, highly swellable hydrogels are preferably crosslinked, i.e. they contain compounds having at least two double bonds which are polymerized into the polymer network.

Suitable crosslinking agents are in particular methylenebisacrylamide and methylenebismethacrylamide, polyol esters of unsaturated mono- or polycarboxylic acids, such as diacrylates or triacrylates, for example butanediol diacrylate or methacrylate or ethylene glycol diacrylate or methacrylate, and trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives, as described, for example, in EP-A 343 427. The contents of EP-A 343427 are also expressly incorporated into this disclosure.

Furthermore, the hydrophilic, highly swellable hydrogels are particularly preferably post-crosslinked as aqueous gels or surface crosslinked as ground and sieved-off polymer particles, in both cases in a manner known per se. Crosslinking agents suitable for this are compounds which contain at least two groups which can form covalent bonds with the carboxyl groups of the hydrophilic polymers. Suitable compounds are, for example, di- or polyglycidyl compounds, such as diglycidyl phosphonate, alkoxysilyl compounds, polyaziridines, polyamines or polyamidoamines, or mixtures of the above compounds with one another (see for example EP-A 83022, EP-A 543303 and EP-A 530438). EP-A 349935 in particular describes polyamidoamines which are suitable as crosslinking agents. The contents of the patents listed above are expressly incorporated into this disclosure.

The hydrophilic, highly swellable hydrogels can be prepared by polymerization methods known per se. Polymerization in aqueous solution by the gel polymerization method is preferred. In this, from 15 to 50% strength by weight aqueous solutions of one or more hydrophilic monomers and, if desired, a suitable graft base are polymerized in the presence of a free-radical initiator, preferably without mechanical mixing, using the Trommsdorff-Norrish effect (Bios Final Rep. 363.22; Makromol. Chem. 1, 169 (1947)). The polymerization reaction can be carried out in the temperature range from 0° C. to 150° C., preferably from 10° C. to 100° C., either at atmospheric pressure or under increased or reduced pressure. As is customary, the polymerization can also be carried out under an inert gas blanket, preferably of nitrogen. The polymerization can be initiated by high-energy electromagnetic radiation or by the conventional chemical polymerization initiators, for example organic peroxides, such as benzoyl peroxide, t-butyl hydroperoxide, methyl ethyl ketone peroxide or cumene hydroperoxide, azo compounds, such as azodiisobutyronitrile, and inorganic peroxy compounds, such as $(NH_4)_2S_2O_8$ or $K_2S_2O_8$ or $H_2O_2$, if desired in combination with reducing agents, such as sodium bisulfite and iron(II) sulfate, or redox systems having as their reducing component an aliphatic or aromatic sulfinic acid, such as benzenesulfinic acid or toluenesulfinic acid, or derivatives of these acids, such as, for example, Mannich adducts of sulfinic acids, aldehydes and amino compounds, as described in DE-C 1 301 566.

The quality properties of the polymers can be improved further by continued heating of the polymer gels for several hours in the temperature range from 50 to 130° C., preferably from 70 to 100° C.

If the hydrogel to be freeze-dried is prepared by the gel polymerization method, it need not be isolated in the dried form. Instead, the swollen reaction product can be passed directly to freeze-drying. Using this method, the degree of swelling of the polymer, and thus the pore size of the product to be prepared according to the invention, can be regulated through the monomer concentration in the polymerization solution.

Of course, however, previously dried hydrogel may also be swollen by addition of the required amount of water and then freeze-dried.

Porous polymers prepared according to the invention may, depending on the application requirement, be mechanically comminuted and, if desired, subjected to surface treatment, as described for example in DE-A41 38 408, with retention of the advantages associated with the porous structure.

The freeze-drying in the following examples was carried out using a commercially available freeze-drying apparatus of the LYOVAC GT 2 type (LEYBOLD-HERAEUS), with an integrated vacuum pump having a PNEUROP capacity of 7.6 m$^3$/h and an ultimate partial pressure without gas ballast of less than $2.5 \times 10^{-4}$ mbar.

The drying process was identical in all cases. The gel to be freeze-dried, having varying degree of swelling resulting from a swelling time of at least 48 hours in each case, was frozen in advance within a plastic bag in the form of a layer with, as far as possible, the same thickness throughout of between 1 and 5 cm and a shape corresponding as closely as possible to the dryer plate of the freeze-dryer. The freezing was carried out in a commercially available freezer at a temperature between −10 and −20° C. The gel, in the abovementioned shape, was transferred from the plastic bag onto the dryer plate of the freeze-dryer and was dried at an initial dryer plate temperature of −20° C., under the highest achievable vacuum, and as ambient temperature, a room temperature between 20 and 25° C. Drying was carried out to constant weight, recognizable from an ultimate vacuum of ca. 0.15 mbar and a rise in the dryer plate temperature to ambient temperature.

EXAMPLE 1

The freeze-drying was carried out using a polymer gel prepared by adiabatic gel polymerization of 850 parts of acrylic acid and 42.5 parts of tetraallyloxyethane in 3240 parts of water, using 25 parts of a 4% strength solution of 2,2'-azobis(2-amidinopropane) dihydrochloride, 11.5 parts of a 0.75% strength hydrogen peroxide solution and 14.5 parts of a 0.15% strength solution of ascorbic acid, under an inert gas blanket of $N_2$ and with an initiation temperature of 12° C. The acidic gel was comminuted mechanically using a commercially available meat grinder, as used in the meat processing industry, partially neutralized by means of 27% strength caustic soda solution (4000 parts of gel, 1297 parts of 27% strength NaOH, corresponding to a degree of neutralization of the acrylic acid of 74 mol %), and, to improve homogeneity, passed twice more through the meat grinder. The polymer gel obtained in this way was freeze-dried in the above-described manner without further dilution, giving a product similar to groundnut flip which was significantly looser, i.e. more open-celled, than the same starting material oven-dried, hot-air-dried or drum-dried in the conventional manner.

EXAMPLE 2

The same gel as described in Example 1 was now diluted with deionized water down to a solids content of 3% by weight, allowed to swell and freeze-dried. This gave a flaky product with significantly lower bulk density than polymer freeze-dried as in Example 1. The BET specific surface area of this product (Example 2) was 5.05 m$^2$/g.

For comparison, the same starting material, likewise diluted down to 3%, but now oven-dried, then ground and sieved at 100/800 μm, gives a product with a BET specific surface area of from 0.3 to 0.6 m$^2$/g.

EXAMPLE 3

A polymer gel was prepared under the same conditions as described in Example 1, but using a lower concentration of crosslinking agent, and was then diluted to (a) a solids content of 10% by weight, (b) secondly to a solids content of 1% by weight. The materials with these two degrees of swelling were freeze-dried after the appropriate swelling time. The two polymer products obtained had different pore sizes corresponding to the degree of preswelling; this can be seen clearly on scanning electron micrographs: product (b) having a degree of preswelling of 99% shows significantly larger pores than product (a) having a degree of preswelling of 90%.

EXAMPLE 4

Commercially available superabsorbent SANWET® IM 7000 in particle size 100–850 μm was allowed to swell in various amounts of deionized water, freeze-dried and mechanically ground, and the fraction 100–850 μm was used for determination of the BET specific surface area and the specific pore volume. Table 1 shows the degree of swelling and all the measurement data.

TABLE 1

| Example | Degree of swelling* of SAP (%) | BET specific surface area (m²/g) | Specific pore volume (mm³/g) |
|---|---|---|---|
| 4 a | 80 | 2.61 | 12.6 |
| 4 b | 85 | 2.72 | 19.8 |
| 4 c | 90 | 2.98 | 61.2 |
| 4 d | 95 | 4.31 | 97.4 |
| 4 e | 99 | 7.10 | 134.8 |
| Comparison IM 7000 | — | 0.9 | 11.8 |

*Degree of swelling = % by weight of water in the water/SAP mixture before drying

We claim:

1. A process for the preparation of a dried hydrophilic, swellable hydrogel, which comprises freeze-drying a preswollen hydrogeal which is the water-swollen product of the components comprising water and a hydrophilic, swellable polymer, wherein said process results in dried hydrogel with a BET specific surface area of from 2 to 15 m²/g.

2. The process as claimed in claim 1, wherein the preswollen hydrogel, the water:hydrophilic, swellable polymer weight ratio is from 2:1 to 500:1.

3. The process as claimed in claim 1, wherein said dried, porous, hydrophilic, swellable hydrogel has a specific pore volume of from $1.3 \times 10^{-2}$ to $2 \times 10^{-1}$ cm³/g.

4. The process as claimed in claim 1, wherein said dried, porous, hydrophilic, swellable hydrogel has a pore radius distribution of from 1.5 to 5 cm³/g×Å.

5. The process as claimed in claim 1, wherein the preswollen hydrogel is a hydrophilic, swellable polymer of at least one hydrophilic monomer.

6. The process as claimed in claim 5, wherein at least one hydrophilic monomer is a compound of the formula I

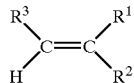

(I)

where
$R^1$ is hydrogen, methyl or ethyl,
$R^2$ is the —COOR⁴ group, the sulfonyl group, the phosphonyl group, the phosphonyl group esterified with a ($C_1$–$C_4$)-alkanol, or a group of the formula

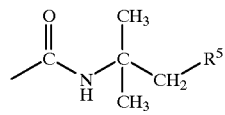

$R^3$ is hydrogen, methyl, ethyl or the carboxyl group,
$R^4$ is hydrogen, amino or hydroxy-($C_1$–$C_4$)alkyl and
$R^5$ is the sulfonyl group, the phosphonyl group or the carboxyl group.

7. The process as claimed in claim 5, wherein said hydrophilic, swellable polymer is a copolymer.

8. The process as claimed in claim 7, wherein said copolymer is a graft copolymer which is the reaction product of the components comprising at least one hydrophilic monomer and a graft base which is swellable in an aqueous medium.

9. The process as claimed in claim 5, wherein said hydrophilic, swellable polymer comprises a natural product which is swellable in an aqueous medium.

10. The process as claimed in claim 5, wherein said hydrophilic, swellable polymer is a crosslinked polysaccharide ether.

11. The process as claimed in claim 5, wherein at least one hydrophilic monomer is acrylic acid.

12. The process as claimed in claim 5, wherein at least one hydrophilic monomer is methacrylic acid.

13. The process as claimed in claim 1, wherein the dried, porous, hydrophilic, swellable hydrogel is mechanically comminuted or is obtained from a mechanically comminuted preswollen hydrogel, in order to obtain said BET specific surface area, and the product of said process is optionally subjected to a surface treatment.

14. The process as claimed in claim 1, wherein said process comprises the following steps:
producing said preswollen hydrogel by gel polymerization to obtain a swollen reaction product, and
carrying out said freeze-drying of the resulting swollen reaction product, optionally after isolating said swollen reaction product in dried form.

15. The product made by the process of claim 1.

* * * * *